3,282,096
APPARATUS FOR TESTING RELAYS
John K. Bullard, Point Pleasant, Oswald I. Gilbertson, Nutley, and Wilbur E. Strube, Maywood, N.J., assignors to Western Electric Company, Incorporated, New York, N.Y., a corporation of New York
Filed June 18, 1964, Ser. No. 376,123
3 Claims. (Cl. 73—161)

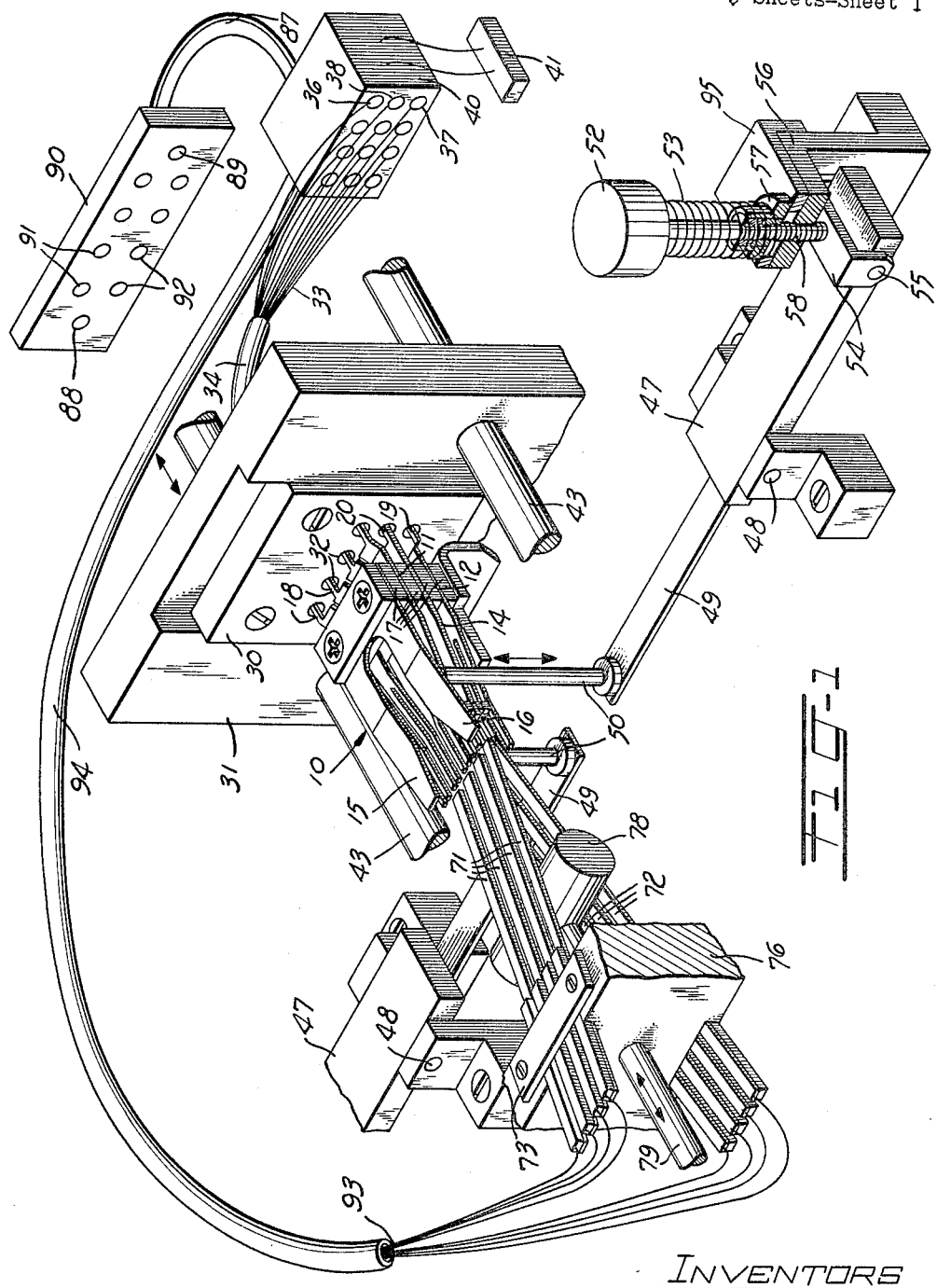

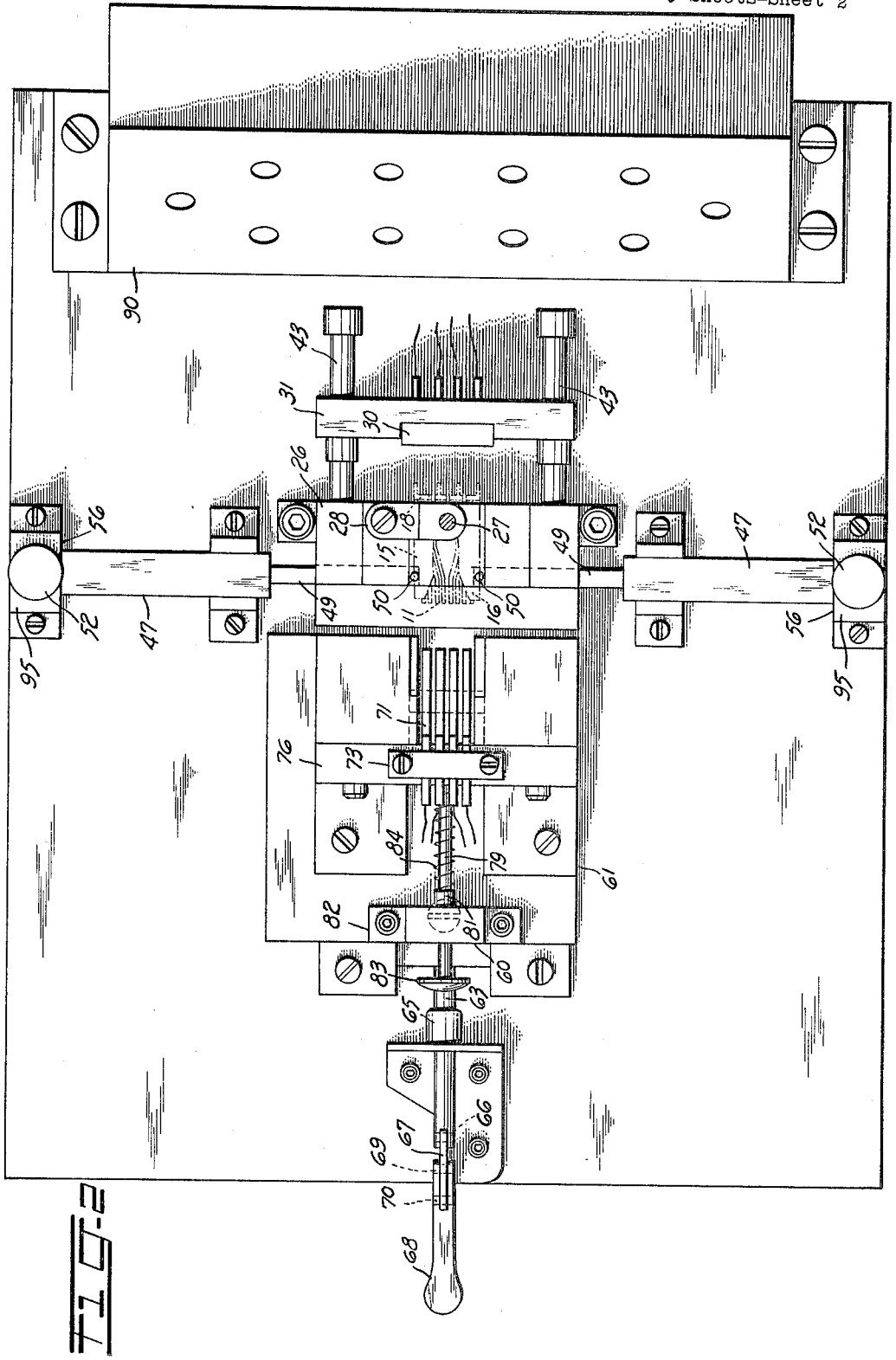

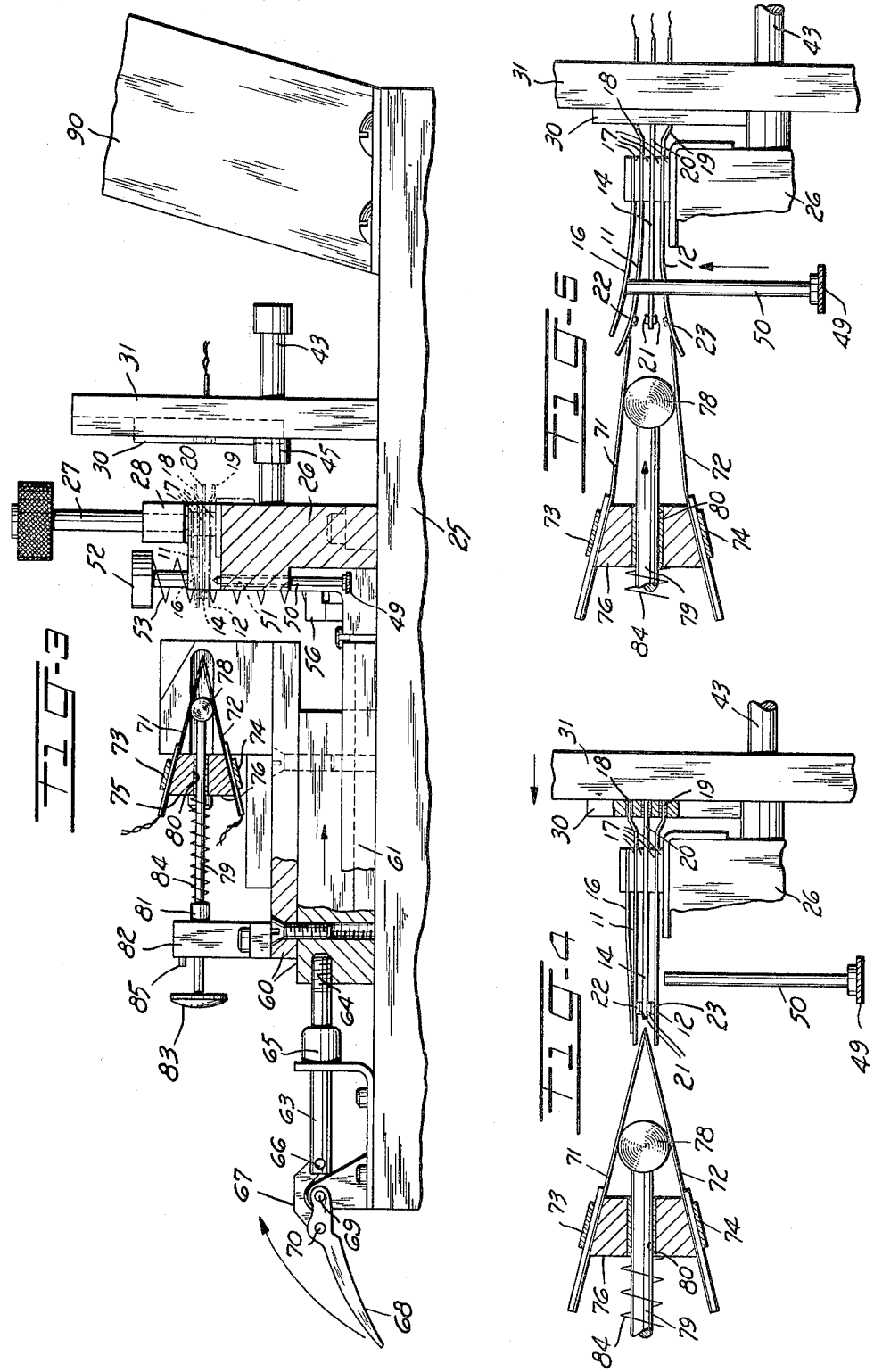

This invention relates to apparatus for testing relays, particularly the minimum and maximum pressures exerted by the contact springs thereof.

In the development of small, or, miniature relays, it has been necessary not only to design new manufacturing equipment, but also to design new apparatus for testing the relays to assure that they function accurately while in use.

An object of the present invention is an apparatus which is simple in structure and highly efficient in testing the springs of relays.

In accordance with the object, the invention comprises apparatus for testing relay spring pileups, which apparatus includes a support for the spring pileups, a test set with a contact block having contacts adapted for electrical connection between the springs and the test set, and means actuated to flex certain of the springs to test their minimum and maximum pressures.

Other objects and advantages will be apparent from the following detailed description when considered in conjunction with the accompanying drawings wherein:

FIG. 1 is an isometric view of the apparatus, illustrating the electrical connections therefrom to a test set and its associated indicating lamps;

FIG. 2 is a top plan view of the apparatus;

FIG. 3 is a vertical sectional view of the apparatus;

FIG. 4 is a fragmentary vertical sectional view illustrating portions of the apparatus in unoperated positions; and FIG. 5 is an illustration of the structure shown in operated positions in FIG. 4 flexing the spring contacts.

*The article*

With reference to FIG. 1, the article to be tested by the instant apparatus is a spring pileup 10 for a miniature relay having a series of top contact springs 11, a series of bottom contact springs 12, a series of stationary contact springs 14 and a pair of return springs 15 and 16. These springs are mounted in a conventional manner with insulating spacers 17, the series of springs having terminals 18, 19, and 20 at one end which are receivable in conventional sockets for this particular type of relay. The stationary springs 14, FIG. 5, have contact members 21 upon the top and bottom sides thereof to be engaged by contact members 22 and 23 of the top and bottom springs 11 and 12, respectively. The springs 15 and 16 engage the outside top contact springs 11.

*The apparatus*

The apparatus includes a base 25 on which a support or nest 26 for the spring pileup 10 is mounted. A thumb screw 27, threadedly mounted in a bracket 28, may be driven downwardly by the rotation thereof to firmly engage the spring pileup on the support to firmly lock the spring pileup in position. A contact block 30, mounted in a slide 31, has apertures 32 therein positioned in rows, adapted to receive the terminals 18, 19, and 20 of the top contact springs 11, the bottom contact springs 12, and the stationary contact springs 14 respectively. In the apertures 32 are electrical socket-like structures (not shown) connected respectively to conductive wires 33 of a cable 34 so that each socket in each row will be connected respectively to terminals in rows 36, 37, and 38 of a test set 40. A suitable source of electrical energy 41 is connected to the test set. The slide 31, of the contact block 30, is supported on parallel bars 43 for movement between its inactive position shown in FIG. 3 and its connected or active position shown in FIGS. 4 and 5. The bars 43 are mounted on the support 26, and through the aid of spacers 45, the slide 31 may be located relative to the support 26 and assure connection of the terminals of the springs in the relay with their respective sockets of the contact block 30.

Means are provided to flex the springs 15 and 16 upwardly to test the forces therein. This means includes levers 47 pivotally supported at 48 and having cantilever springs 49 extending outwardly therefrom toward each other from the inner ends of the levers. Plungers 50, supported by the free ends of the cantilever springs 49, extend upwardly through guide apertures 51 in the support 26 in alignment with portions of the springs 15 and 16. The means to actuate the levers 47 includes spring-pressed plungers 52, a collar 58, and springs 53 which normally hold the levers 47 in their inactive positions. The lower ends of the plungers 52 are rotatably connected to yokes 54 which are pivotally connected at 55 to the adjacent ends of the levers 47. A bracket 56, mounted on the base 25, straddles the adjacent or outer end of each lever 47 and is centrally apertured for the plunger to extend therethrough. An internally threaded stop collar 57 is mounted on each plunger 52. An apertured M slide 95 is adapted to receive stop collar 57 of the plunger so that after each plunger is depressed a given distance dependent on location of apertures in slide 95, testing for maximum and minimum pressures of springs 15 and 16, with respect to contact springs 11 as illustrated in FIG. 5, is made.

A carriage 60 is supported by the base 25 and is movable between given limits between guides 61 mounted on the base. One of the limits for the carriage may be defined as the starting position illustrated in FIGS. 2 and 3, the other being the operating position shown in FIGS. 1, 4, and 5. The means to move the carriage between these positions includes a plunger or push-rod 63 having one end 64 threadedly connected to the carriage 60 (FIG. 3). The push-rod 63 acts through a guide 65 and has its other end connected through a pivot 66 to a link 67. A lever 68, pivotally supported at 69, is also pivotally connected to the opposing end of the link at 70. With the lever 68 in the position shown in FIG. 3 the carriage 60 is held in its outer or inactive position but movement of the lever in the direction of the arrow will cause the carriage to move into its active position. Furthermore, returning the lever 68 to the position shown moves the carriage from the active position to the inactive position.

Two sets of flat springs, which may be identified as an upper set 71 and a lower set 72 of activating members are initially mounted to assume the angular position illustrated in FIGS. 1, 3 and 4, are mounted at 73 and 74, respectively on a block 75 fixed to a vertical member 76 of the carriage 60. An actuator 78, circular in cross-section is positioned between the sets of springs 71 and 72 and is mounted on one end of a rod 79. The rod 79 extends through an aperture 80 in the block 76, through a stop collar 81 and through an aperture in a bracket 82 mounted on the carriage. The outer end of the rod 79 is provided with a knob 83 for use in manually forcing the actuator 78 to the right and a spring 84 normally returns the rod and actuator to their starting positions. An adjustable screw 85 on the bracket 82 is positioned to engage the knob 83 to control the forward movement of the actuator 78.

*Operation*

After the spring pileup 10 is located accurately on the support 26 and secured in place by the screw 27, the slide 31 may be moved from the position shown in FIGS. 2 and 3, to the position shown in FIGS. 1, 4 and 5. This action electrically connects the three sets of relay springs; namely, the top contact springs 11, the bottom contact springs 12, and the stationary contact springs 14 to the test set 40. Associated also with a test set through conductors in a cable 87 are lamps 88 and 89 of a panel 90, which will be associated with the staionary springs 14 and a row of lamps 91 for the top contacts 11 as well as a row of lamps 92 for the bottom contact springs 12. To complete the electrical circuits for the test set 40 conductive wires 93 of a cable 94 are connected individually to the springs 71 and 72 and included in the test set 40, so that through association with their respective top contact springs 11 an bottom contact springs 12 complete tests on the springs of the relay may be performed. After the contact block 30 has been moved into the position shown in FIGS. 1, 4 and 5, the carriage may be moved into its active position shown in these figures through actuation of the lever 68. Following this action the plungers 52 may be forced downwardly, to flex the springs 15 and 16, and rotated to temporarily lock them in the activated position. The cantilever springs 49 associated with the levers 47 will apply the desired forces on the plungers 50 to flex the springs 15 and 16 upwardly. The plunger 79 may then be actuated to apply desired forces through actuator 78 to the sets of springs 71 and 72 to determine through the test set whether or not the top and bottom contact springs 11 and 12 have the required minimum holding pressures to assure proper contacts with their respective stationary springs 14. After these excess or extended forces have been applied to the contact springs 11 and 12 through the springs 71 and 72 as illustrated in FIG. 5, the results of these actions may be determined by the test set 40 and the lamps 88, 89, 90, and 91. As a result of these tests the operator will know what adjustments need be made in the springs, which springs needs adjustments, and the directions in which these adjustments must be carried out. After the adjustments have been made in the springs, the spring pileup may be run through a second test and through the action particularly regarding the lights the operator will know if further adjustments may be made or the spring pileup is ready for the finished relay structure.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. Apparatus for testing a relay spring pileup which pileup includes a plurality of contact springs and return spring means normally abutting at least one of the contact springs, which apparatus includes:

means for supporting the relay spring pileup,
a test set,
means for connecting the test set to the contact springs,
means for flexing the return spring means away from the contact springs to which they abut to remove the force thereof from the contact springs, and
means connected to the test set means for flexing the contact springs, after the force of the return spring means has been removed therefrom, to determine pressures exerted thereby.

2. Apparatus for testing a relay spring pileup according to claim 1, wherein the means for flexing the contact springs includes:

flat spring members having free ends adapted to respectively engage the contact springs,
carriage means for supporting the flat spring members, the carriage being movable from a first position where the flat spring members are out of engagement with the relay spring pileup to a second position where the flat spring members engage the contact springs of the relay spring pileup,
said flat spring members being in two groups supported in planes angularly disposed from each other, and
flexing means mounted on the carriage means operable when the carriage is in its second position, to be moved between said group of flat spring members to flex their free ends away from each other to thereby flex the contact springs.

3. Apparatus for testing a relay spring pileup according to claim 1, wherein the means for flexing the return spring means away from the contact springs includes:

a plunger operable to be moved from a first position, where it is spaced from the return spring means, to a second position where it engages the return spring means and displaces it from contact with the contact springs,
a lever connected to the plunger,
means for activating the lever, thereby moving the plunger from its first position to its second position, and,
means connected to the activating means for locking the plunger in its second position.

References Cited by the Examiner

UNITED STATES PATENTS

| | | | |
|---|---|---|---|
| 2,272,921 | 2/1942 | Paulson | 73—161 |
| 2,292,235 | 8/1942 | McCarthy | 73—161 |
| 2,483,867 | 10/1949 | Anderson et al. | 73—161 |
| 2,573,488 | 10/1951 | Raetsch et al. | 73—161 |
| 2,789,430 | 4/1957 | Sinclaire | 73—161 |

DAVID SCHONBERG, *Primary Examiner.*

LOUIS R. PRINCE, *Examiner.*

M. B. HEPPS, *Assistant Examiner.*